(12) United States Patent
Udayakumaran et al.

(10) Patent No.: US 8,732,679 B2
(45) Date of Patent: May 20, 2014

(54) LOOP TRANSFORMATION FOR COMPUTER COMPILER OPTIMIZATION

(75) Inventors: Sumesh Udayakumaran, San Diego, CA (US); Chihong Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 12/724,467

(22) Filed: Mar. 16, 2010

(65) Prior Publication Data
US 2011/0231830 A1  Sep. 22, 2011

(51) Int. Cl.
*G06F 9/45* (2006.01)

(52) U.S. Cl.
USPC ............................. 717/137; 717/150; 717/160

(58) Field of Classification Search
None
See application file for complete search history.

(56) References Cited

U.S. PATENT DOCUMENTS

| | | | |
|---|---|---|---|
| 5,287,510 A | 2/1994 | Hall et al. | |
| 5,835,776 A | 11/1998 | Tirumalai et al. | |
| 6,345,384 B1 | 2/2002 | Sato | |
| 6,523,173 B1 * | 2/2003 | Bergner et al. | 717/152 |
| 6,598,221 B1 | 7/2003 | Pegatoquet et al. | |
| 7,100,157 B2 | 8/2006 | Collard | |
| 2003/0065698 A1 | 4/2003 | Ford | |
| 2004/0093319 A1 | 5/2004 | Ogasawara et al. | |
| 2009/0138864 A1 | 5/2009 | Tal | |

OTHER PUBLICATIONS

Accuracy of Profile Maintenance in Optimizing Compilers, Youfeng Wu, Programming Systems Research Lab Intel Corporation, Proceedings of the Sixth Annual Workshop on Interaction between Compilers and Computer Architectures (INTERAC'02), 0/7695-1534-7/02 2002 IEEE.
Beyond Induction Variables: Detecting and Classifying Sequences Using a Demand-Driven SSA Form Michael P. Gerlek, Eric Stoltz, and Michael Wolfe Oregon Graduate Institute of Science & Technology, ACMTransactionsonProgrammIngLanguagesandSystems,vol. 17, No. 1, Jan. 1995, pp. 85-122.
Lecture 9: Dataflow, COS 598C—Advanced Compilers, Prof. David August, Department of Computer Science Princeton University.
International Search Report and Written Opinion—PCT/US2011/028696, ISA/EPO-May 13, 2011.
Sheayun Lee, Jaejin Lee, Sang Lyul Min, Jason Hiser and Jack W. Davidson: "Code Generation for a Dual Instruction Set Processor Based on Selective Code Transformation", Proceedings of the Workshop on Software and Compilers for Embedded Systems 2003, LNCS, Sep. 2003 (Sep. 2003), pp. 33-48, XP002634824, Springer-Verlag, Berlin, Heidelberg.

* cited by examiner

*Primary Examiner* — Chuck Kendall
(74) *Attorney, Agent, or Firm* — Nicholas J. Pauley; Peter Michael Kamarchik; Joseph Agusta (57) ABSTRACT

A new computer-compiler architecture includes code analysis processes in which loops present in an intermediate instruction set are transformed into more efficient loops prior to fully executing the intermediate instruction set. The compiler architecture starts by generating the equivalent intermediate instructions for the original high level source code. For each loop in the intermediate instructions, a total cycle cost is calculated using a cycle cost table associated with the compiler. The compiler then generates intermediate code for replacement loops in which all conversion instructions are removed. The cycle costs for these new transformed loops are then compared against the total cycle cost for the original loops. If the total cycle costs exceed the new cycle costs, the compiler will replace the original loops in the intermediate instructions with the new transformed loops prior to generation of final code using the instruction set of the processor.

20 Claims, 8 Drawing Sheets

LOOP TRANSFORMATION FOR COMPUTER COMPILER OPTIMIZATION

TECHNICAL FIELD

The present disclosure relates, in general, to compiler architecture and, more particularly, to compiler optimization using loop transformations.

BACKGROUND

Most programming languages operate with different types of data, each of which may use different levels of precision. Two examples of common data types are integer and floating point data. Operations involving floating point data conventionally use a higher precision than integer operations. The actual precision value often depends on the characteristics of the processor. In some processors, regular, single precision might be 32 bits, while double precision would be 64 bits. Other example precisions include 16 bit single and 32 bit double, 8 bit single and 16 bit double, and the like. In such a computer, floating point operations would be assigned higher precision data compared to integer operations Computer code is often written in a high level programming language that is conducive for humans to design and write. However, in order to execute this high level programming code, a computer will convert or compile the high level code into a low level code that can be directly executed by the processor. This low level code can be machine language, assembly language, or the like. When converting and processing the high level code into the low level code, a performance metric that is often monitored is total runtime of the resultant code. Among other factors, the runtime is a function of the number of instructions and their individual latencies. Therefore, reducing the amount of instructions and using instructions with lower latency can improve the performance of an application.

In many compiler architectures, the conversion process involves multiple stages in which various intermediate level code representations are generated, after which differing code optimizations are applied before finally converting the code into the low level equivalent. This multi-stage process is used because many algorithms for code optimization are easier to apply one at a time to an intermediate level code, or because the input to one optimization relies on the processing performed by another optimization. The manner in which this multi-stage process proceeds also depends on the processor architecture.

Modern processors generally operate with instruction sets. An instruction set, or instruction set architecture (ISA), is the programming part of the computer architecture that addresses the native data types, instructions, registers, addressing modes, memory architecture, interrupt and exception handling, external input/output (I/O), and the like. An ISA can also include a specification of the set of machine language operation codes, which are the native commands implemented by a particular processor. There are various types of ISAs for modern processors including, for example, reduced instruction set computer (RISC), complex instruction set computer (CISC), explicitly parallel instruction computing (EPIC), and the like. The compiler will generally use a code generator to generate low level machine or assembly code using the associated instruction set. The code generator may take as input a parsed or abstract syntax tree of the high level code or the output of an optimization and converts the tree into a linear sequence of instructions in the low level code.

Instruction sets may provide separate operations depending on the precision of the data being operated on. For example, an ISA may define a full precision add operation and a half precision add operation. In the integer/floating point example from above, the addition of two floating point data types will be handled by the full precision add operation, while addition of two integers will be handed by the half precision add. These particular operations use corresponding registers. In general the computer architecture will define full precision and half precision registers for use with related operations. Therefore, code generation in such architectures is generally driven by the precision of the data types of the data that resides in the registers.

Because high level programming code can provide for code that operates on both a half precision data type and a full precision data type, an ISA also usually includes conversion operations that will up-convert half precision data types to full precision for operations and then down-convert the full precision data types back to half precision after the operation is completed. However, these conversion operations usually bring higher processing cycle costs and latency. It would be advantageous to produce the set of most efficient, least latent operations as possible without sacrificing the programmer's intended precision of the output of the program.

Figure 1:
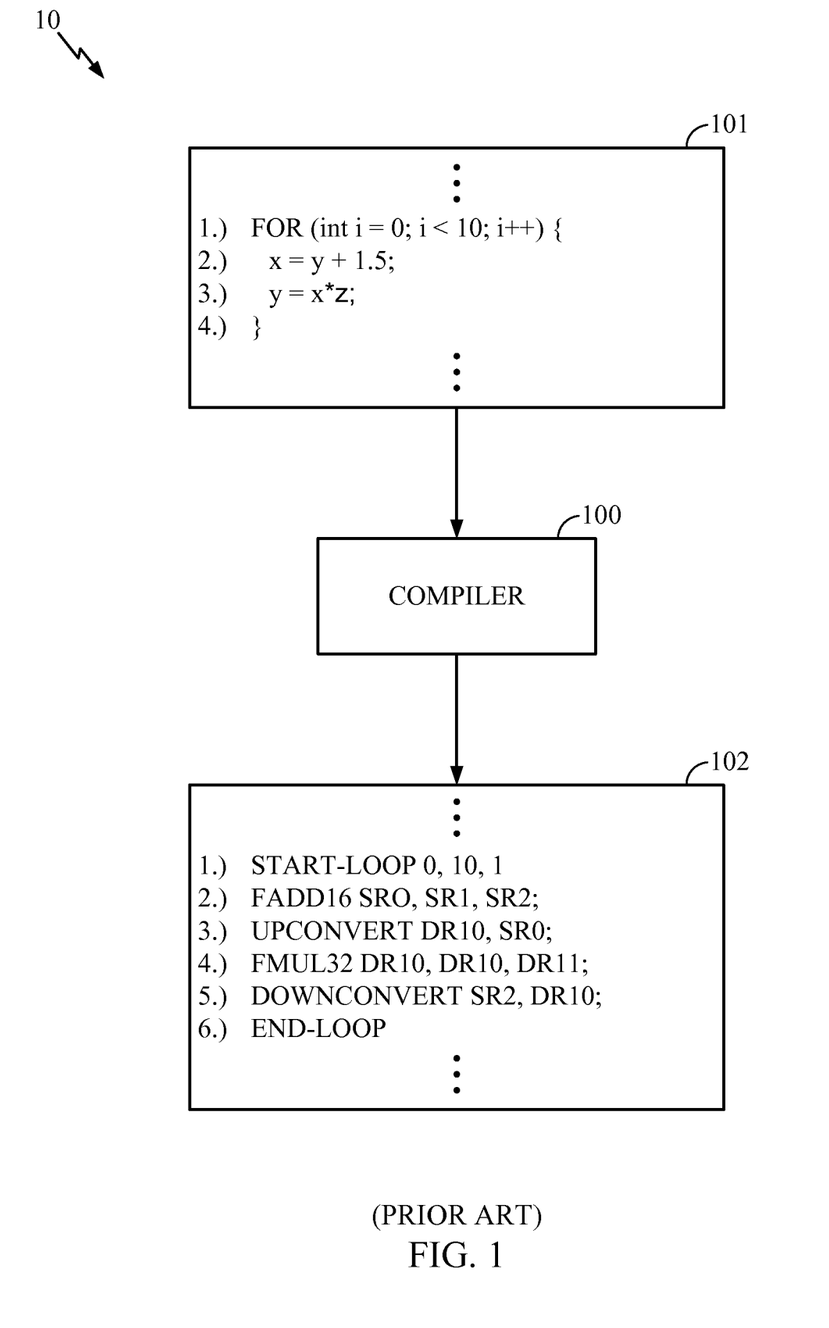
FIG. 1 is a block diagram illustrating a prior art compilation process.

Turning now to FIG. 1, a block diagram is shown which illustrates an example compilation process 10. Input code 101 represents a segment of high level programming code that a compiler 100 will compile. The input code 101 represents a loop that is executed as a part of the high level code that performs some arithmetic operations. Line 1 sets up the loop operation; line 2 performs a first arithmetic operation using two single-precision variables and a constant; line 3 performs a second arithmetic operation using three variables, in which one of the variables, 'z', has been defined as a double precision data type; and line 4 defines the end point of the loop. The compiler 100 processes the input code 101 and produces output code 102, which is the output loop segment resulting from compilation of the input code 101. Further, the output code is in a intermediate representation where the variables have been replaced by virtual registers. An appropriate single or double precision register is used based on the type of the variable. The output code 102 may be converted into instructions of the ISA at a later time by the compiler.

The loop defined in four lines of high level code in the input code 101 results in a loop defined in six lines in the output code 102. Lines 1 and 6 of the output code 102 define the loop. Single precision registers are denoted by SR followed by a number. Double precision registers are denoted by DR followed by number. The precision of the instruction is denoted by the suffix number. In line 2, a single precision add, FADD16, is defined in which SR1 represents the single precision register to hold the constant "1.5", SR2 represents the variable 'y', and SR0 represents the result of the add, 'x'. Because the multiplication instruction of line 3 in the input code 101 involves a double precision data type, line 3 of the output code 102 provides an up-conversion instruction that up-converts the variable 'x', in register SR0, into a double precision data type in register DR10. The double precision multiplication is defined in line 4 in which 'x'—DR10 is multiplied with 'z'—DR11, with the result being stored back in DR10, now representing the variable 'y'. The variable 'y' is defined as a single precision data type in the remainder of the program. Therefore, line 5 in the output code 102 provides a down-conversion instruction that down-converts the double precision variable 'y'—DR10 into a single precision data type in register SR2.

Each of these instructions is processed 10 times, as defined in the loop. In some processor architectures, the processor cycle cost for a conversion operation is usually higher than a simple add or other simple arithmetic operation. Thus, the conversion costs that result from the loop defined in the output code 102 are relatively high compared with the actual cycle costs for the defined arithmetic functions. Many modern processors provide only for instruction set operations between same precision type variables. Moreover, several multiple pipeline processor architectures will organize the instructions into separate pipelines in which each pipeline will only handle instructions of a particular precision. Therefore, conversions are essentially necessary for instruction processing.

BRIEF SUMMARY

The various embodiments of the present teachings are directed to optimizing loop performance in a compiler architecture by transforming such loops into more efficient processes. The loops that are transformed do not contain calls to functions. The described compiler architecture starts by generating the equivalent intermediate instructions for the original high level source code. For each loop in the intermediate instructions, a total cycle cost is calculated using a cycle cost table associated with the compiler. The compiler then generates intermediate code for replacement loops in which all conversion instructions are removed. The cycle costs for these new transformed loops are then compared against the total cycle cost for the original loops. If the total cycle costs exceed the new cycle costs, the compiler will replace the original loops in the intermediate instructions with the new transformed loops prior to execution of the intermediate instruction set.

Representative embodiments of the present teachings are directed to methods for compiling high level source code. These methods include translating the source code into an intermediate instruction set, determining a total cycle cost for a loop in the intermediate instruction set, determining an estimated cycle cost for an equivalent transformed loop without conversions in the transformed loop, comparing the total cycle cost with the estimated cycle cost, and, in response to the total cycle cost exceeding the estimated cycle cost, replacing the loop with an equivalent transformed loop.

Further representative embodiments of the present teachings are directed to computing devices that include a processor, an input/output (I/O) interface coupled to the processor, a storage memory coupled to the processor, a compiler stored on the storage memory, and high level source code stored on the storage memory. When the high level source code is selected for execution, the processor executes the compiler, which triggers execution of a code generator associated with the compiler. The code generator, executed by the processor, generates an intermediate instruction set based on the high level source code. The executing compiler also triggers execution of a cost analyzing module associated with the compiler. The cost analyzing module, executed by the processor, determines a total cycle cost for a loop in the intermediate instruction set and determines an estimated cycle cost for an equivalent transformed loop without conversions in the transformed loop. The executing compiler also compares the total cycle cost with the estimated cycle cost, and replaces the loop with the equivalent transformed loop in response to the total cycle cost exceeding the estimated cycle cost.

Additional representative embodiments of the present teachings are directed to computer-readable media that includes program code tangibly stored thereon. The program code includes code to translate source code into an intermediate instruction set, code to determine a total cycle cost for a loop in the intermediate instruction set, code to determine an estimated cycle cost for an equivalent transformed loop without looped conversion instructions, code to compare the total cycle cost with the estimated cycle cost, and code, executable in response to the total cycle cost exceeding the estimated cycle cost, to replace the loop with the equivalent transformed loop.

Further representative embodiments of the present teachings are directed to systems for compiling high level source code. These systems include means for translating the source code into an intermediate instruction set, means for determining a total cycle cost for a loop in the intermediate instruction set, means for determining an estimated cycle cost for an equivalent transformed loop without conversions in the transformed loop, means for comparing the total cycle cost with the estimated cycle cost, and means, executable in response to the total cycle cost exceeding the estimated cycle cost, for replacing the loop with the equivalent transformed loop.

Further representative embodiments of the present teachings are directed to computer compiler integrated circuits (ICs) that include a plurality of functional code modules. These modules also include a compilation module configured to manage compilation of high level source code into executable low level code, a code generator, a cost table, a cost analyzing module, an instruction set architecture (ISA), wherein these functional code modules are integrated into a single IC. The computer compiler ICs further include a bus interface coupled to a computer bus, the computer bus enabling communication with a processor for executing the plurality of functional code modules. When executed by the processor, the compilation module configures the compiler to trigger execution of the code generator. The code generator, executed by the processor, generates an intermediate instruction set using the ISA and based on the high level source code. The compiler further triggers execution of the cost analyzing module. The cost analyzing module, executed by the processor, accesses the cost table and calculates a total cycle cost for a loop in the intermediate instruction set. The executing cost analyzing module also calculates an estimated cycle cost for an equivalent transformed loop (without looped conversions) generated by the code generator. The executing compiler then compares the total cycle cost with the estimated cycle cost and replaces the loop with the equivalent transformed loop in response to the total cycle cost exceeding the estimated cycle cost.

The foregoing has outlined rather broadly the features and technical advantages of the present disclosure in order that the detailed description that follows may be better understood. Additional features and advantages can be described hereinafter, which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features, which are believed to be characteristic of the disclosure, both as to its organization and method of operation, together with further objects and advantages, can be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

If the number of conversions used within an intermediate code loop increases processing cycle costs, it may be advantageous to reduce that number to the maximum extent possible. However, in the current compiler designs, there are no mechanisms that analyze the code to be compiled and use that analysis to determine how to transform the particular set of code to minimize conversions. In general, users are simply left to experience the conversion latency as coded by the program designers.

Figure 2:
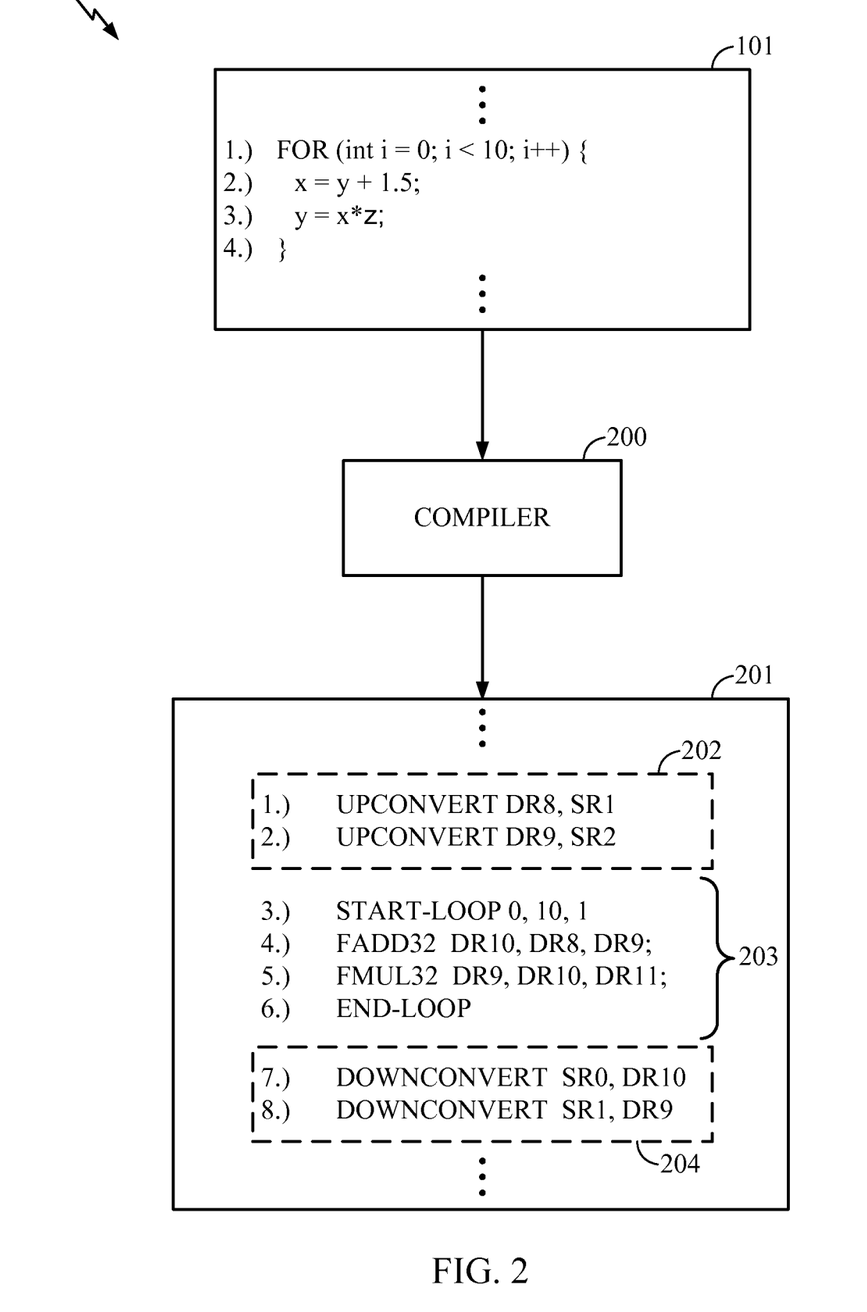
FIG. 2 is a block diagram illustrating a compilation process configured according to one embodiment of the present teachings.

FIG. 2 is a block diagram illustrating a compilation process 20 configured according to one embodiment of the present teachings. Similar to the compilation process 10 (FIG. 1), a compiler 200 processes the loop portion illustrated in the input code 101 and produces a loop portion of output code 201. However, when the compilation begins, the compiler 200 analyzes the loop provided in the input code 101 to determine whether or not a loop transformation would result in a cycle cost savings. In the illustrated embodiment of FIG. 2, the compiler 200 has determined that compiling the input code 101 using a loop transformation will provide cost benefits at execution time. Unlike the output code 102 (FIG. 1), the output code 201 provides for conversions only outside of the converted loop structure. Thus, even though the output code 201 results in more lines of code than the output code 102 (FIG. 1), processing the output code 201 will result in a substantial reduction in cycle cost because the conversion steps are outside of the loop structure.

In order to transform the loop, the compiler 200 analyzes the input code 101 to determine what variables will be used within the loop and which of those variables are currently defined as half precision variables. In response to this analysis, the compiler 200 generates a beginning process, a prologue 202, that up-converts any half precision variables to full precision prior to the beginning of the loop at line 3. The compiler 200 then generates a body code 203 that handles the arithmetic functions or code logic defined for the loop in the input code 101. The loop begins at line 3 and follows, at line 4, with a full precision add of the up-converted representation, DR8, of the constant, '1.5'—SR1, and the up-converted representation, DR9, of the variable, 'y'—SR2, in which the sum is stored in the full precision register, DR10. A full precision multiplication is then provided, at line 5, in which the full precision representation, DR10, of the half precision variable, 'x'—SR0, is multiplied with the full precision variable 'z'—DR11, in which the product is stored in the full precision register, DR9, which represents the half precision variable, 'y'—SR2. After the processing in the body code 203 ends with the end of the loop at line 6, a back end process, an epilogue 204, is provided to down-convert each of the full precision variables used in the body code 203 that will be used outside of the loop as half precision variables. Therefore, the more cycle-cost-expensive conversion operations are removed from the loop, reducing the overall cycle cost of the processing.

In general, the "cycle cost" metric corresponds to processing time expended by the central processing unit ("CPU" or "processor") in processing a particular operation or instruction. Cycle costs vary according to the particular processor design and the ISA of the processor. Table 1 discloses a list of operations within an exemplary ISA along with an associated latency number that corresponds to the cycle cost for that particular operation. It should be noted that the example information provided in Table 1 is purely for purposes of describing the conceptual operation of the present teachings. As such, the present teachings are, in no way, limited to any particular set of cycle costs.

TABLE 1

| Instruction | Description | Format | Latency |
| --- | --- | --- | --- |
| FADD16 | 16 bit floating point add. | FADD16, dest, source1, source2 | 1 |
| FADD32 | 32 bit floating point add. | FADD32, dest, source1, source2 | 2 |
| FMUL16 | 16 bit floating point multiply. | FMUL16, dest, source1, source2 | 1 |
| FMUL32 | 32 bit floating point multiply. | FMUL32, dest, source1, source2 | 2 |
| UPCONVERT | Convert from 16 bit to 32 bit registers. | UPCONVERT dest, source | 3 |
| DOWNCONVERT | Convert from 32 bit to 16 bit registers | DOWNCONVERT dest, source | 3 |
| START-LOOP | Start of a loop. | START-LOOP, initial-value, trip-count, stride | 1 |
| END-LOOP | End of a loop. | END-LOOP | 1 |

In analyzing the input code 101 to determine whether a loop transformation will benefit performance, the compiler 200 simulates the code conversion from the high level code to the intermediate level code and then adds up the overall cycle cost. For example, with reference to Table 1, the compiler 200 first simulates the code conversion as the output code 102 (FIG. 1). To determine the cycle cost of the output code 102, the compiler 200 would add each instructions latency value. Thus, the output code 102 would result in a cost of '1' for the line 1 START-LOOP instruction, '1' for the line 2 FADD16 add, '3' for the line 3 UPCONVERT, '2' for the line 4 FMUL32, '3' for the line 5 DOWNCONVERT, and '1' for the END-LOOP. Because the loop defines 10 iterations, the total cycle cost would be [10*(1+2+3+2+3+1)]=120 cycles. The compiler 200 would then simulate the code conversion of the transformed loop as the output code 201. The cycle cost of the output code 201 would result in '3' for the line 1 UPCONVERT, '3' for the line 2 UPCONVERT, '1' for the line 3 START-LOOP, '2' for the line 4 FADD32, '2' for the line 5

FMUL32, '1' for the line 6 END-LOOP, '3' for the line 7 DOWNCONVERT, and '3' for the line 8 DOWNCONVERT. Because the conversion instructions occur outside of the loop, there is no multiplier effect on the conversion costs. Thus, the total cycle cost would be [3+3+10*(1+2+2+1)+3+3]=72 cycles. In considering the total cycle cost savings of the transformed loop compared with the straight code conversion, the compiler 200 would elect to perform loop transformation of the input code 101.

Figure 3:
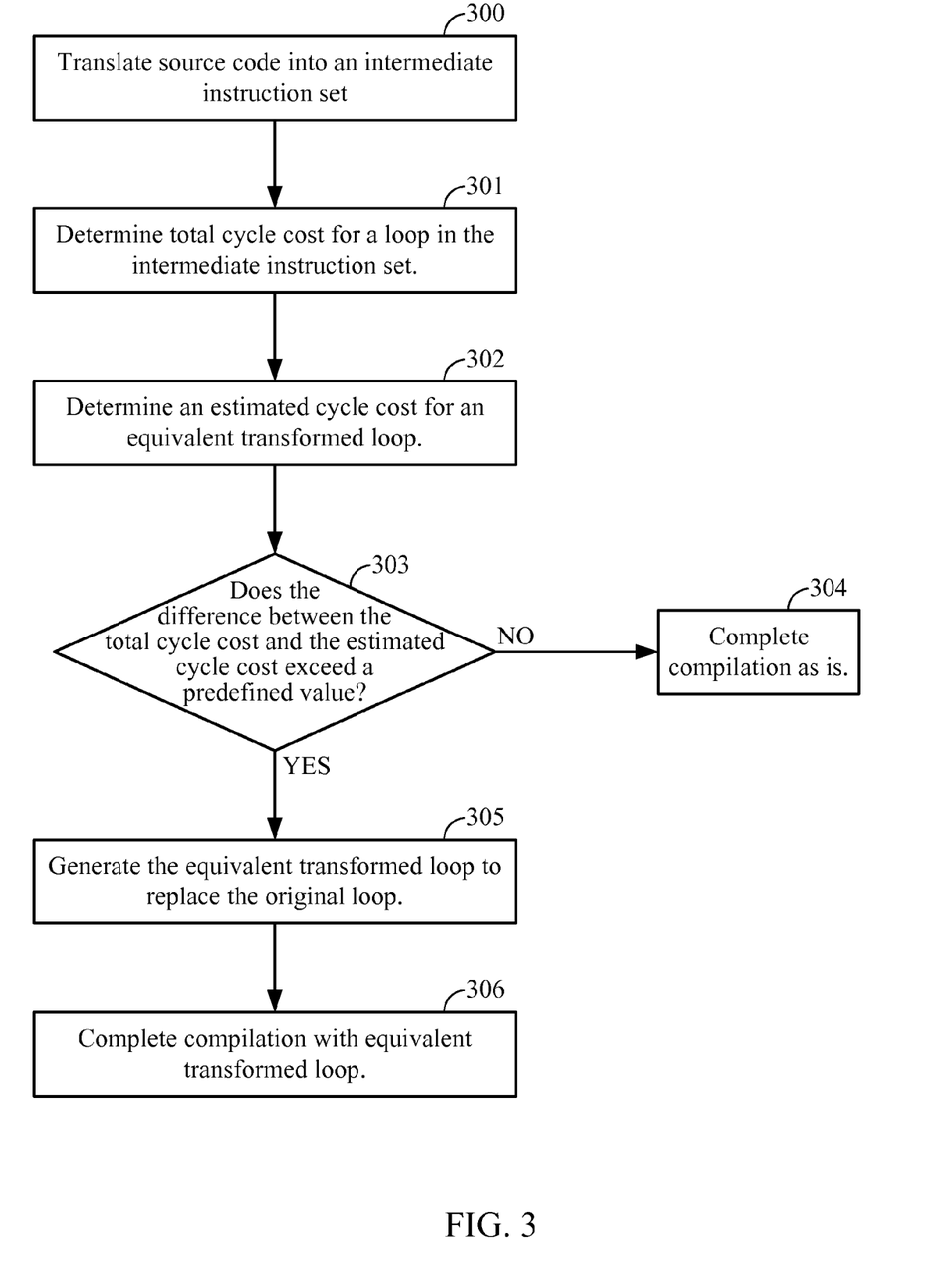
FIG. 3 is a functional block diagram illustrating example functional blocks present in one embodiment of the disclosed teachings.

FIG. 3 is a functional block diagram illustrating example functional blocks present in one embodiment of the disclosed teachings. In block 300, a compiler translates source code into an intermediate instruction set. A total cycle cost for any loops within the intermediate instruction set are determined in block 301. The compiler then determines an estimated cycle cost for an equivalent transformed loop in block 302. A determination is made, in block 303, whether the difference between the total cycle cost and estimated cycle cost exceeds some predefined value. If not, then, in block 304, the compilation continues "as is," with the non-transformed intermediate instruction set. However, if the difference exceeds the threshold value, the compiler generates the equivalent transformed loop, in block 305, to replace the original loop in the intermediate instruction set. In block 306, compilation is completed with the equivalent transformed loop.

Figure 4:
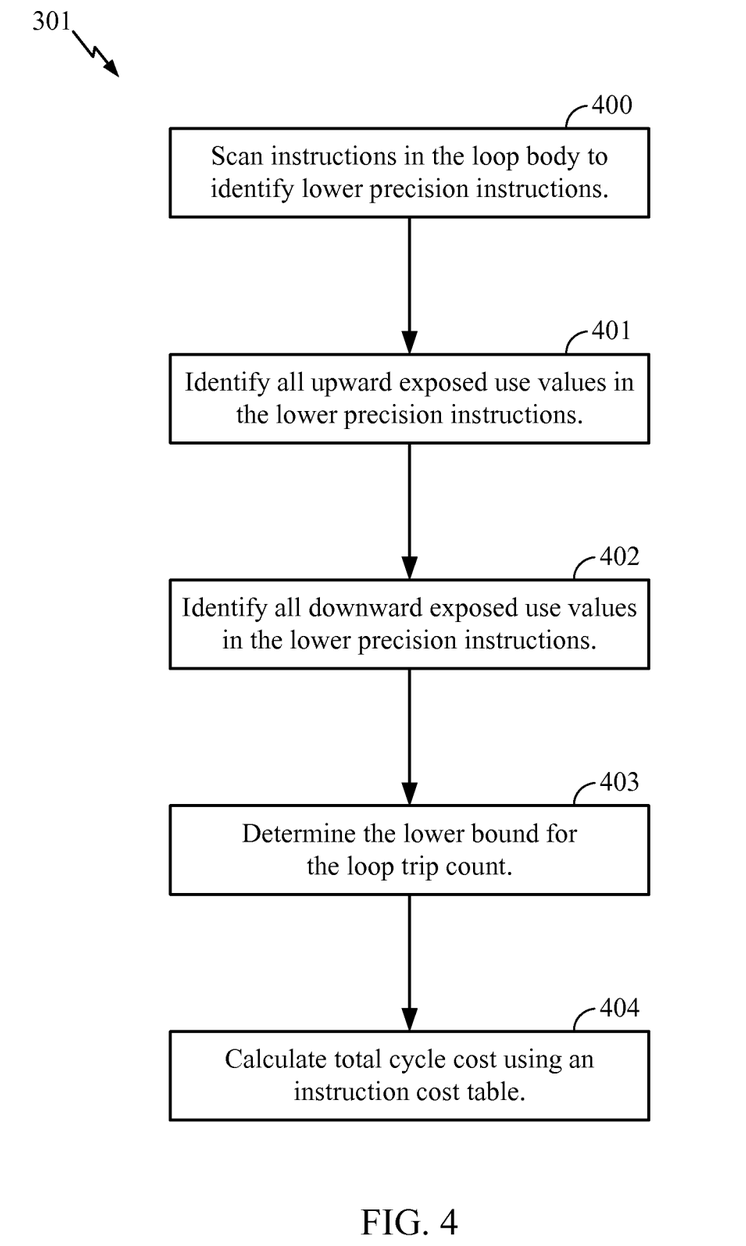
FIG. 4 is a functional block diagram illustrating example detailed sub-blocks present in one of the functional blocks of FIG. 3.

In calculating the cycle costs of the regular intermediate instruction set, the compiler identifies which lower precision instructions and variables will be used in mixed precision operations within the loop (thereby needing up-conversion), and identifies which variables within the loop will be used outside of the loop at a lower precision (thereby needing down-conversion). FIG. 4 is a functional block diagram illustrating example detailed sub-blocks present in the functional block 301 of FIG. 3. In block 400, the compiler scans instructions in a loop body to identify lower precision instructions. The compiler then identifies, in block 401, all "upward exposed use" values involving lower precision registers "Upward exposed use" values in this context are those variables and values that are defined before the loop, but which will be used within the loop. These upward exposed use values that involve lower precision registers will be up-converted in order to eliminate their use within the loop. In block 402, the compiler then identifies all "downward exposed define" values in the lower precision instructions. "Downward exposed define" values in this context are those variables and values that are defined within the loop and used after the end of the loop. These downward exposed define values involving high precision registers will be down-converted after the end of the loop in order to accommodate their use in subsequent code. The determination of such upward exposed use values and downward exposed define values may be made using known, standard liveness analysis techniques.

In many cases involving loops, the actual loop trip count will not necessarily be determinable by the compiler's initial analysis of the loop. When the trip count relies on a simple counter, the total trip count is easily obtainable. However, some counters may rely on variables that are not determined until runtime. In most such cases, a lower bound of loop trip counts may be determined in a well known manner. In block 403, the compiler determines such a lower bound loop trip count for the loop under analysis. With this determined information, in block 404, the compiler then calculates the total cycle cost using an instruction cost table associated with the ISA of the related processor. The total cycle cost may then be compared against an estimated cycle cost for an equivalent transformed loop, as provided in functional block 303 (FIG. 3). If the lower bound on the loop trip count cannot be determined, the transformation is aborted.

Figure 5:
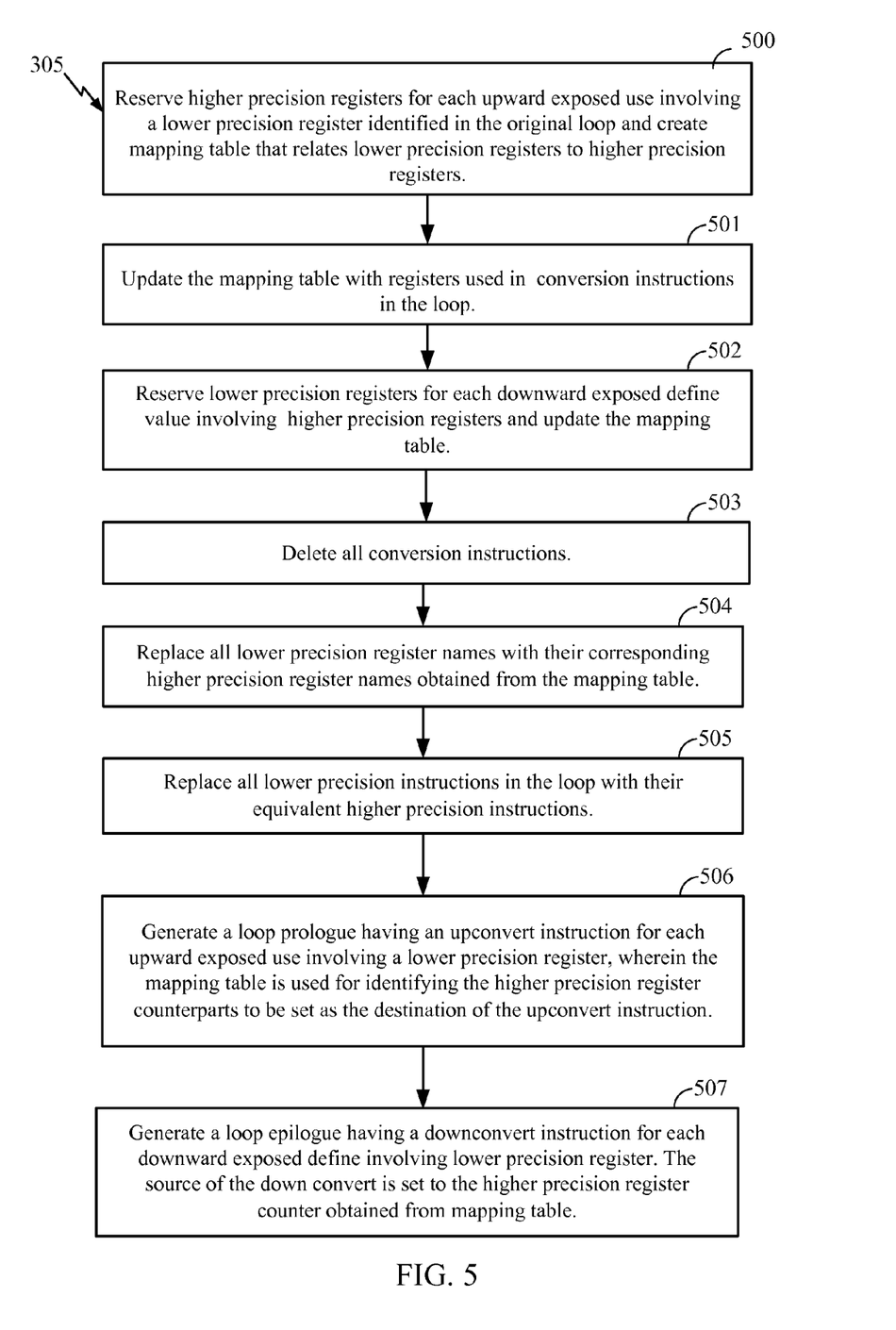
FIG. 5 is a functional block diagram illustrating example sub-blocks making up one of the functional blocks of FIG. 3.

FIG. 5 is a functional block diagram illustrating example sub-blocks making up one of the functional blocks of FIG. 3. When it is determined that an equivalent transformed loop is to replace the existing or intermediate language loop, higher precision registers are reserved, in block 500, for each upward exposed use value involving a lower precision register identified in the original loop and a mapping table is created that relates lower precision registers to higher precision registers In block 501, the mapping table is updated with registers used in conversion instructions in the loop Lower precision registers are reserved, in block 502, for each downward exposed define value involving higher precision registers and the mapping table is updated accordingly. All conversion instructions are deleted, in block 503. In block 504, the lower precision register names are replaced with their corresponding higher precision register names obtained from the mapping table. The lower precision instructions in the loop are also replaced with their equivalent higher precision instructions in block 505. A loop prologue is generated, in block 506, having an upconvert instruction for each upward exposed use involving a lower precision register, wherein the mapping table is used for identifying the higher precision register counterparts to be set as the destination of the upconvert instruction. In block 507, a loop epilogue is generated having a downconvert instruction for each downward exposed define involving lower precision register, in which the source of the down convert is set to the higher precision register counter obtained from mapping table.

Figure 6:
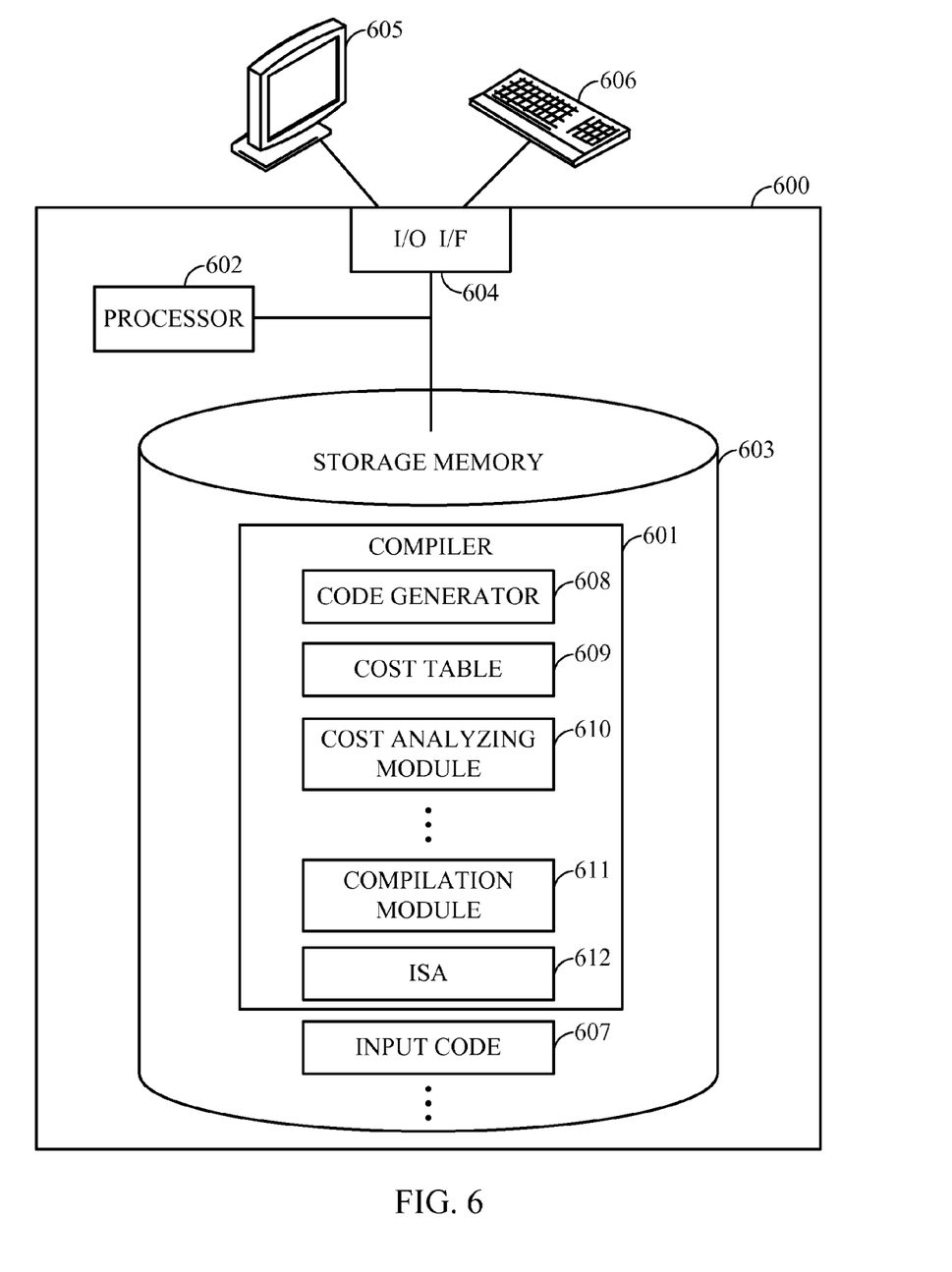
FIG. 6 is a block diagram illustrating a computing device having a compiler configured according to one embodiment of the present teachings.

FIG. 6 is a block diagram illustrating a computing device 600 having a compiler 601 configured according to one embodiment of the present teachings. The computing device 600 includes a processor 602, a storage memory 603, and an input/output (I/O) interface 604. The I/O interface 604 provides an interface to a display device 605 and an input device 606. The storage memory 603 contains various software components and modules including the compiler 601, an input code 607, and the like. When the input code 607 is to be executed by the processor 602, the compiler 601 is triggered and executed for compiling the input code 607. A compilation module 611 of the compiler 601 manages the compilation process by first retrieving the input code 607. A cost analyzing module 610 of the compiler 601 is then triggered to construct the intermediate instruction set using a code generator 608 and an ISA 612 of the compiler. If loops are present in the intermediate instruction set, the executing cost analyzing module 610 then constructs an equivalent instruction set which transforms the loops to exclude any conversion operations within the loop. The executing cost analyzing module 610 then compares the cycle cost for each intermediate instruction set using a cost table 609 associated with the compiler 601. When the equivalent intermediate instruction set with the transformed loops results in a cost savings over the input intermediate instruction set, the compilation module 611 inserts the equivalent transformed loops into the intermediate instruction set and finishes the rest of the tasks in the code generator 608 before transmit the final instructions to the processor 602 for execution. When the equivalent intermediate instruction set does not offer a cost savings, the intermediate instruction set is transmitted "as is" to the rest of the code generator 608 before execution on processor 602.

Figure 7:
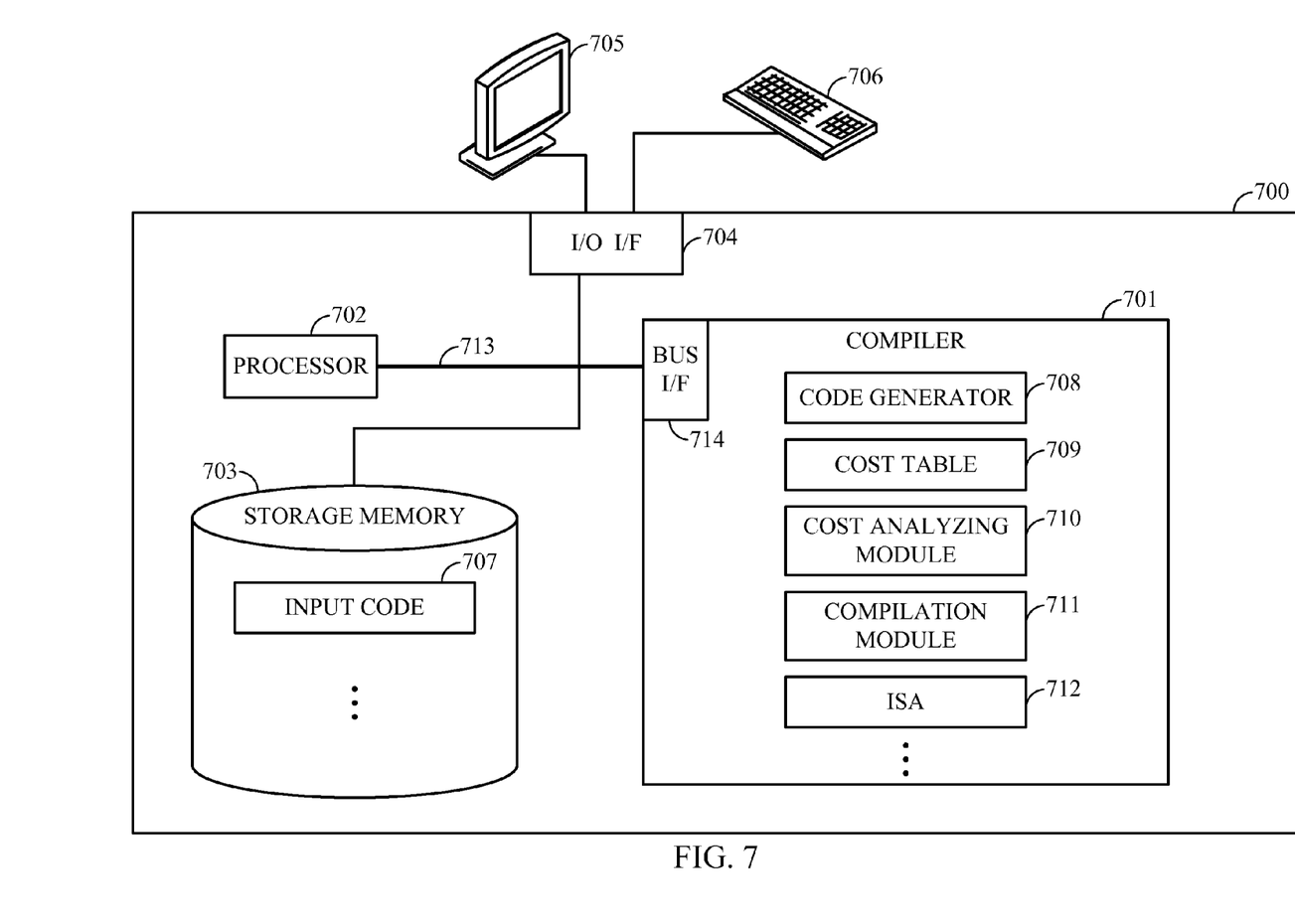
FIG. 7 is a block diagram illustrating a computing device having a compiler configured according to one embodiment of the present teachings.

It should be noted that while selected embodiments of the present teachings may provide the compiler stored in a local memory, such as the compiler 601 stored in storage memory 603, alternative embodiments of the present teachings provide the compiler coded as firmware or a combination of firmware and circuitry. FIG. 7 is a block diagram illustrating a computing device 700 having a compiler 701 configured according to one embodiment of the present teachings. The computing device 700 includes a processor 702, a storage memory 703, and an I/O interface 704. The I/O interface 704 provides a communication interface between the computing device 700 and a display device 705 and an input device 706. The compiler 701 is implemented in the computing device 700 as firmware stored on a separate memory chip. The compiler 701 communicates with the processor 702 over computer bus 713. A bus interface 714 provides the communication interface between the compiler 701 and the computer bus 713. The firmware compiler 701 includes operation modules similar to those contained in the software compiler 601 (FIG. 6). For example, the firmware compiler 701 includes a compilation module 711 which controls the compilation process of the compiler 701, including control of a code generator 708, in communication with the processor 702 via computer bus 713. It also includes a cost analyzing module 710 which, when used with the instructions and information found in an ISA 712 and a cost table 709, calculates the comparative cycle costs of an intermediate instruction set related to the input code 707 with an equivalent intermediate instruction set that has transformed loops and then directs which version of the intermediate instruction set to transmit to the processor 702 over computer bus 713 for processing.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 8:
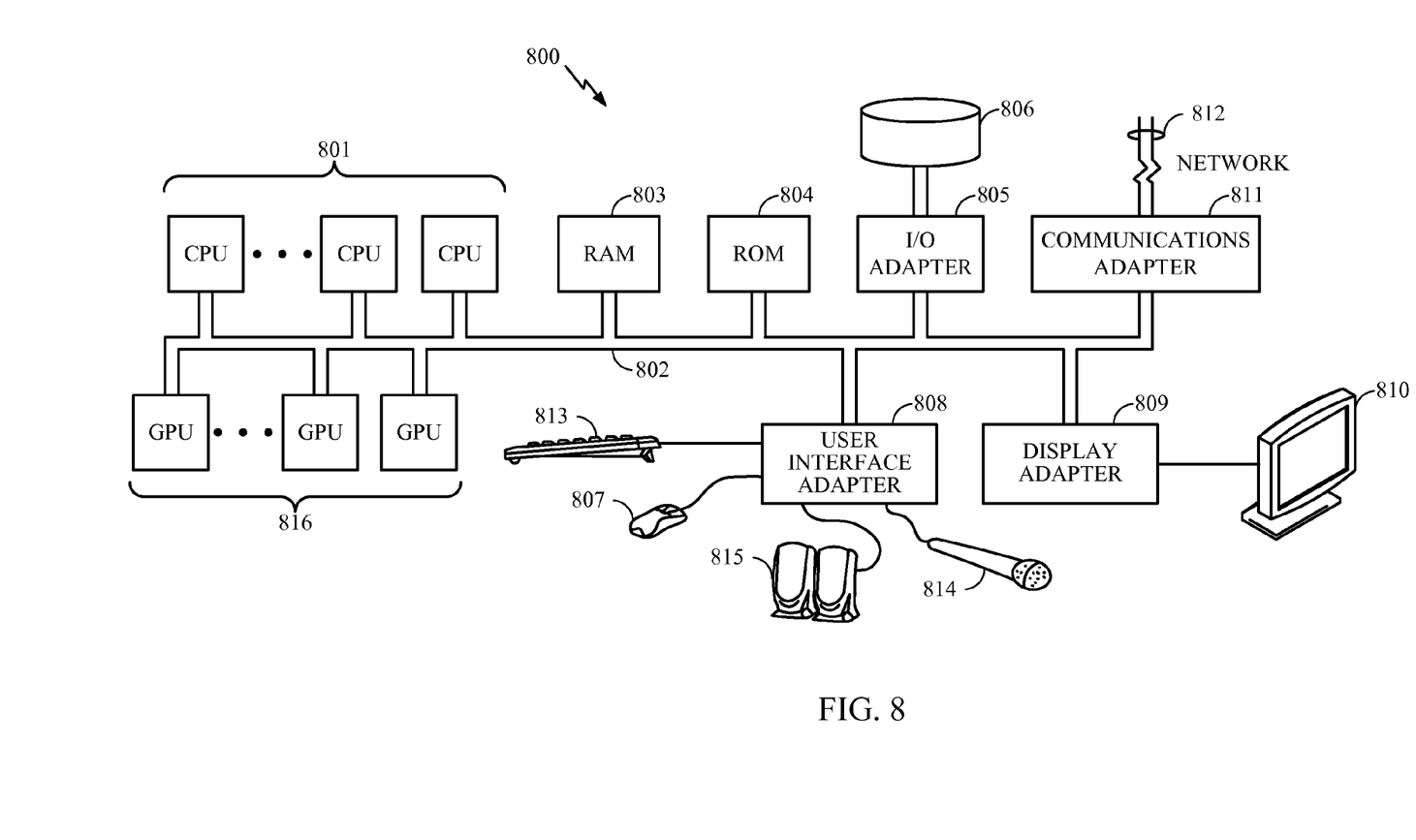
FIG. 8 illustrates an exemplary computer system which may be employed to implement certain embodiments of the present teachings.

FIG. 8 illustrates an exemplary computer system 800 which may be employed to implement certain embodiments of the present teachings. A central processing unit ("CPU" or "processor") 801 is coupled to a system bus 802. The CPU 801 may be any general-purpose processor. The present disclosure is not restricted by the architecture of the CPU 801 (or other components of the exemplary computer system 800) as long as the CPU 801 (and other components of the computer system 800) supports the inventive operations as described herein. As such, the CPU 801 may provide processing to the computer system 800 through one or more processors or processor cores. The CPU 801 may execute the various logical instructions described herein. For example, the CPU 801 may execute machine-level instructions according to the exemplary operational flow described above in conjunction with FIGS. 3-5. When executing instructions representative of the operational steps and signal processing illustrated in FIGS. 3-5, the CPU 801 becomes a special-purpose processor of a special purpose computing platform configured specifically to operate according to the various embodiments of the teachings described herein.

The computer system 800 also includes a random access memory (RAM) 803, which may be SRAM, DRAM, SDRAM, or the like. The computer system 800 includes a read-only memory (ROM) 804 which may be PROM, EPROM, EEPROM, or the like. The RAM 803 and ROM 804 hold user and system data and programs, as is well known in the art.

The I/O adapter 805 connects to a storage device(s) 806, such as one or more of hard drive, compact disc (CD) drive, floppy disk drive, tape drive, etc., to the computer system 800. The storage devices are utilized in addition to the RAM 803 for the various memory requirements. The communications adapter 811 is adapted to couple the computer system 800 to a network 812, which may enable information to be input to and/or output from the computer system 800 via the network 812 (e.g., the Internet or other wide-area network, a local-area network, a public or private switched telephony network, a wireless network, any combination of the foregoing). A user interface adapter 808 couples user input devices, such as a keyboard 813, a pointing device 807, and a microphone 814 and/or output devices, such as speaker(s) 815 to the computer system 800. A display adapter 809 is driven by the CPU 801 or by a graphical processing unit (GPU) 816 to control the display on the display device 810. The GPU 816 may be any various number of processors dedicated to graphics processing and, as illustrated, may be made up of one or more individual graphical processors. The GPU 816 processes the graphical instructions and transmits those instructions to the display adapter 809. The display adapter 809 further transmits those instructions for transforming or manipulating the state of the various numbers of pixels used by the display device 810 to visually present the desired information to a user. Such instructions include instructions for changing state from on to off, setting a particular color, intensity, duration, or the like. Each such instruction makes up the rendering instructions that control how and what is displayed on the display device 810.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art can readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for compiling high level source code stored in a storage memory, said method comprising:
   translating, by a processor, said high level source code into an intermediate instruction set;
   determining, by the processor, a total cycle cost for a loop in said intermediate instruction set;
   determining, by the processor, an estimated cycle cost for an equivalent transformed loop having all conversions outside the transformed loop;
   comparing, by the processor, said total cycle cost with said estimated cycle cost; and
   in response to said total cycle cost exceeding said estimated cycle cost, replacing, by the processor, said loop with said equivalent transformed loop.

2. The method of claim 1 wherein said determining a total cycle cost comprises:
   scanning instructions in said loop to identify lower precision registers;
   identifying all upward exposed use values involving said lower precision registers;
   identifying all downward exposed define values involving said lower precision registers;
   determining a lower bound for a loop trip count of said loop; and
   calculating said total cycle cost using an instruction cost table related to said instructions.

3. The method of claim 2 further comprising in response to said total cycle cost exceeding said estimated cycle cost:
   scanning instructions in said loop to identify lower precision instructions, and higher precision registers;
   reserving at least one additional higher precision register for each of said identified upward exposed use values involving lower precision registers;
   creating a mapping table relating said lower precision registers to said at least one additional higher precision register;
   identifying conversion registers used in conversion instructions in said loop;
   updating said mapping table with said conversion registers; and
   deleting said conversion instructions in said loop.

4. The method of claim 3, further comprising:
   replacing in said loop each lower precision register name representing said lower precision registers with a corresponding higher precision register name representing said higher precision registers from said mapping table;
   replacing said lower precision instructions in the loop with an equivalent higher precision instruction;
   generating a loop prologue having an upconvert instruction for each of said upward exposed use values, wherein said upconvert instruction obtains a destination higher precision register from said mapping table; and
   generating a loop epilogue having a down convert instruction for said downward exposed, wherein a source higher precision register of said convert instruction is obtained from said mapping table.

5. The method of claim 1 wherein said translating, said determining said total cycle cost, said determining said estimated cost, said comparing, and said replacing are performed on a single integrated circuit.

6. A computing device comprising:
   a processor;
   an input/output (I/O) interface coupled to said processor;
   a storage memory coupled to said processor;
   a compiler stored on said storage memory;
   high level source code stored on said storage memory, wherein, when selected for execution, said processor executes said compiler, said executing compiler configured:
     to trigger execution of a code generator associated with said compiler, said code generator executed by said processor and configured to generate an intermediate instruction set based on said high level source code;
     to trigger execution of a cost analyzing module associated with said compiler, said cost analyzing module executed by said processor and configured to determine a total cycle cost for a loop in said intermediate instruction set, wherein said executing cost analyzing module is further configured to determine an estimated cycle cost for an equivalent transformed loop without conversion instructions in the transformed loop;
     to compare said total cycle cost with said estimated cycle cost; and
     to replace said loop with said equivalent transformed loop in response to said total cycle cost exceeding said estimated cycle cost.

7. The computing device of claim 6 wherein, in determining said total cycle cost, said executing cost analyzing module further configures said executing compiler:
   to scan instructions in said loop to identify lower precision registers;
   to identify all upward exposed use values in said lower precision registers to identify all downward exposed define values in said lower precision registers;
   to determine a lower bound for a loop trip count of said loop; and
   to calculate said total cycle cost using an instruction cost table related to said instructions.

8. The computing device of claim 7 wherein, when said total cycle cost exceeds said estimated cycle cost, said executing compiler is further configured:
   to scan instructions in said loop to identify lower precision instructions, and higher precision registers;
   to reserve at least one additional higher precision register for each of said identified upward exposed use values involving lower precision registers;
   to create a mapping table relating said lower precision registers to said at least one additional higher precision register;

to identify conversion registers used in conversion instructions in said loop;
to update said mapping table with said conversion registers;
to delete said conversion instructions in said loop;
to replace in said loop each lower precision register name representing said lower precision registers with a corresponding higher precision register name representing said higher precision registers from said mapping table;
to replace said lower precision instructions in the loop with an equivalent higher precision instruction;
to generate code defining a loop prologue having an upconvert instruction for each of said upward exposed use values, wherein said upconvert instruction obtains a destination higher precision register from said mapping table; and
to generate code defining a loop epilogue having a down convert instruction for said downward exposed, wherein a source higher precision register of said convert instruction is obtained from said mapping table.

9. The computing device of claim 6 wherein, in translating said source code, said code generator is further configured:
to generate an intermediate instruction corresponding to at least one high level instruction contained in said source code; and
to substitute said intermediate instruction for said at least one high level instruction in said intermediate instruction set.

10. A computer-readable medium including program code tangibly stored thereon, comprising:
program code to translate source code into an intermediate instruction set;
program code to determine a total cycle cost for a loop in said intermediate instruction set;
program code to determine an estimated cycle cost for an equivalent transformed loop without looped conversions;
program code to compare said total cycle cost with said estimated cycle cost; and
program code, executable in response to said total cycle cost exceeding said estimated cycle cost, to replace said loop with said equivalent transformed loop.

11. The computer-readable medium of claim 10 wherein said program code to determine a total cycle cost comprises:
program code to scan instructions in said loop to identify lower precision instructions;
program code to identify all upward exposed use values in said lower precision registers;
program code to identify all downward exposed define values in said lower precision registers;
program code to determine a lower bound for a loop trip count of said loop; and
program code to calculate said total cycle cost using an instruction cost table related to said instructions.

12. The computer-readable medium of claim 11 further comprising in response to said total cycle cost exceeding said estimated cycle cost:
program code to reserve at least one additional higher precision register for each of said identified upward exposed use values involving lower precision registers;
program code to create a mapping table relating said lower precision registers to said at least one additional higher precision register;
program code to identify conversion registers used in conversion instructions in said loop;
program code to update said mapping table with said conversion registers;
program code to delete said conversion instructions in said loop;
program code to replace in said loop each lower precision register name representing said lower precision registers with a corresponding higher precision register name representing said higher precision registers from said mapping table;
program code to replace said lower precision instructions in the loop with an equivalent higher precision instruction;
program code to generate code defining a loop prologue having an upconvert instruction for each of said upward exposed use values, wherein said upconvert instruction obtains a destination higher precision register from said mapping table; and
program code to generate code defining a loop epilogue having a down convert instruction for said downward exposed, wherein a source higher precision register of said convert instruction is obtained from said mapping table.

13. The computer-readable medium of claim 10 wherein said program code to translate said source code comprises:
program code to generate an intermediate instruction corresponding to at least one high level instruction contained in said source code; and
program code to substitute said intermediate instruction for said at least one high level instruction in said intermediate instruction set.

14. The computer-readable medium of claim 10 wherein said program code to translate, said program code to determine said total cycle cost, said program code to determine said estimated cost, said program code to compare, and said program code to replace reside on a single integrated circuit.

15. A system for compiling high level source code, said system comprising:
means for translating said source code into an intermediate instruction set;
means for determining a total cycle cost for a loop in said intermediate instruction set;
means for determining an estimated cycle cost for an equivalent transformed loop without conversions;
means for comparing said total cycle cost with said estimated cycle cost; and
means, executable in response to said total cycle cost exceeding said estimated cycle cost, for replacing said loop with said equivalent transformed loop.

16. The system of claim 15 wherein said means for determining a total cycle cost comprises:
means for scanning instructions in said loop to identify lower precision registers;
means for identifying all upward exposed use values in said lower precision registers means for identifying all downward exposed define values in said lower precision registers;
means for determining a lower bound for a loop trip count of said loop; and
means for calculating said total cycle cost using an instruction cost table related to said instructions.

17. The system of claim 16 further comprising in response to said total cycle cost exceeding said estimated cycle cost:
means for scanning instructions in said loop to identify lower precision instructions, and higher precision registers;
means for reserving at least one additional higher precision register for each of said identified upward exposed use values involving lower precision registers;

means for creating a mapping table relating said lower precision registers to said at least one additional higher precision register;

means for identifying conversion registers used in conversion instructions in said loop;

means for updating said mapping table with said conversion registers;

means for deleting said conversion instructions in said loop;

means for replacing in said loop each lower precision register name representing said lower precision registers with a corresponding higher precision register name representing said higher precision registers from said mapping table;

means for replacing said lower precision instructions in the loop with an equivalent higher precision instruction;

means for generating a loop prologue having an upconvert instruction for each of said upward exposed use values, wherein said upconvert instruction obtains a destination higher precision register from said mapping table; and means for generating a loop epilogue having a down convert instruction for said downward exposed, wherein a source higher precision register of said convert instruction is obtained from said mapping table.

18. A computer compiler integrated circuit (IC) comprising:

a plurality of functional code modules, said plurality comprising:
 a compilation module configured to manage compilation of high level source code into executable low level code;
 a code generator;
 a cost table;
 a cost analyzing module;
 an instruction set architecture (ISA);

wherein said plurality of functional code modules are integrated into a single IC;

a bus interface coupled to a computer bus, said computer bus enabling communication with a processor for executing said plurality of functional code modules, wherein, when executed by said processor, said compilation module configures said compiler:
 to trigger execution of said code generator, said code generator executed by said processor and configured to generate an intermediate instruction set using said ISA and based on said high level source code;
 to trigger execution of said cost analyzing module, said cost analyzing module is executed by said processor and configured to access said cost table and calculate a total cycle cost for a loop in said intermediate instruction set, and to calculate an estimated cycle cost for an equivalent transformed loop generated by said code generator, the equivalent loop omitting conversions;
 to compare said total cycle cost with said estimated cycle cost; and
 to replace said loop with said equivalent transformed loop in response to said total cycle cost exceeding said estimated cycle cost.

19. The computer compiler IC of claim 18 wherein, in determining said total cycle cost, said executing cost analyzing module further configures said executing compiler:
 to scan instructions in said loop to identify lower precision registers;
 to identify all upward exposed use values in said lower precision registers;
 to identify all downward exposed define values in said lower precision registers;
 to determine a lower bound for a loop trip count of said loop; and
 to calculate said total cycle cost using an instruction cost table related to said instructions.

20. The computer compiler IC of claim 19 wherein, when said total cycle cost exceeds said estimated cycle cost, said executing compiler is further configured:
 to scan instructions in said loop to identify lower precision instructions and higher precision registers;
 to reserve at least one additional higher precision register for each of said identified upward exposed use values involving lower precision registers;
 to create a mapping table relating said lower precision registers to said at least one additional higher precision register;
 to identify conversion registers used in conversion instructions in said loop;
 to update said mapping table with said conversion registers;
 to delete said conversion instructions in said loop;
 to replace in said loop each lower precision register name representing said lower precision registers with a corresponding higher precision register name representing said higher precision registers from said mapping table;
 to replace said lower precision instructions in the loop with an equivalent higher precision instruction;
 to generate code defining a loop prologue having an upconvert instruction for each of said upward exposed use values, wherein said upconvert instruction obtains a destination higher precision register from said mapping table; and
 to generate code defining a loop epilogue having a down convert instruction for said downward exposed, wherein a source higher precision register of said convert instruction is obtained from said mapping table.

* * * * *